Sept. 2, 1924.  
J. G. SAKOWICZ  
CENTER INDICATOR  
Filed Dec. 8, 1922    2 Sheets-Sheet 2
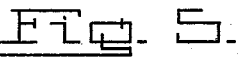 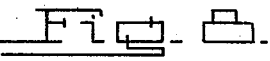
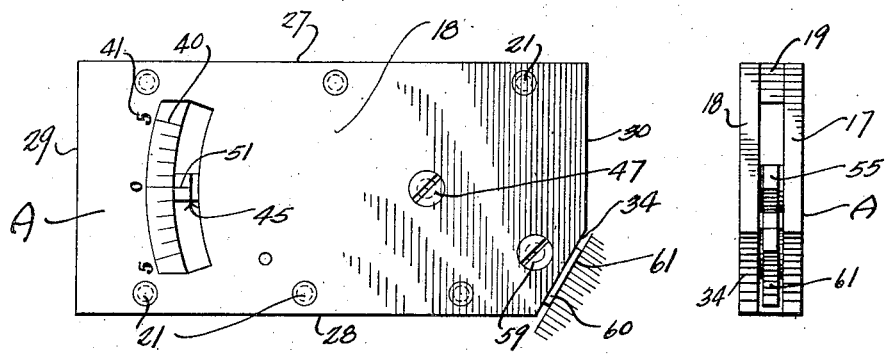
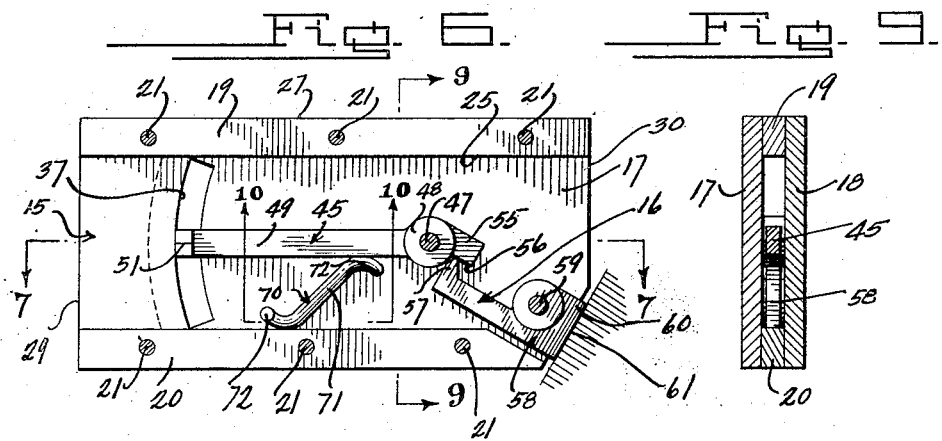
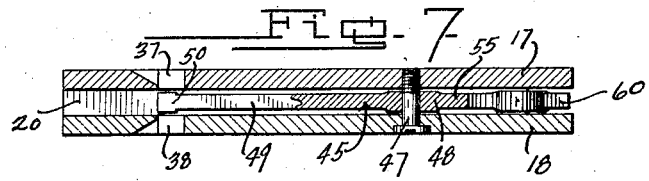
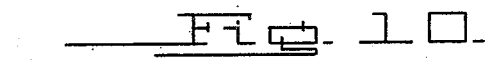
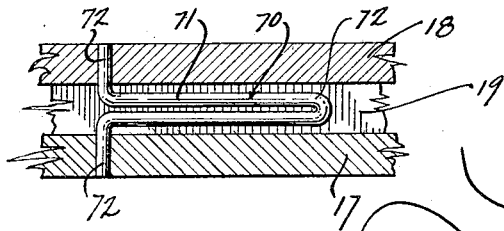
Inventor  
John G. Sakowicz  
By Lancaster *&* Alwine  
Attorneys Patented Sept. 2, 1924.

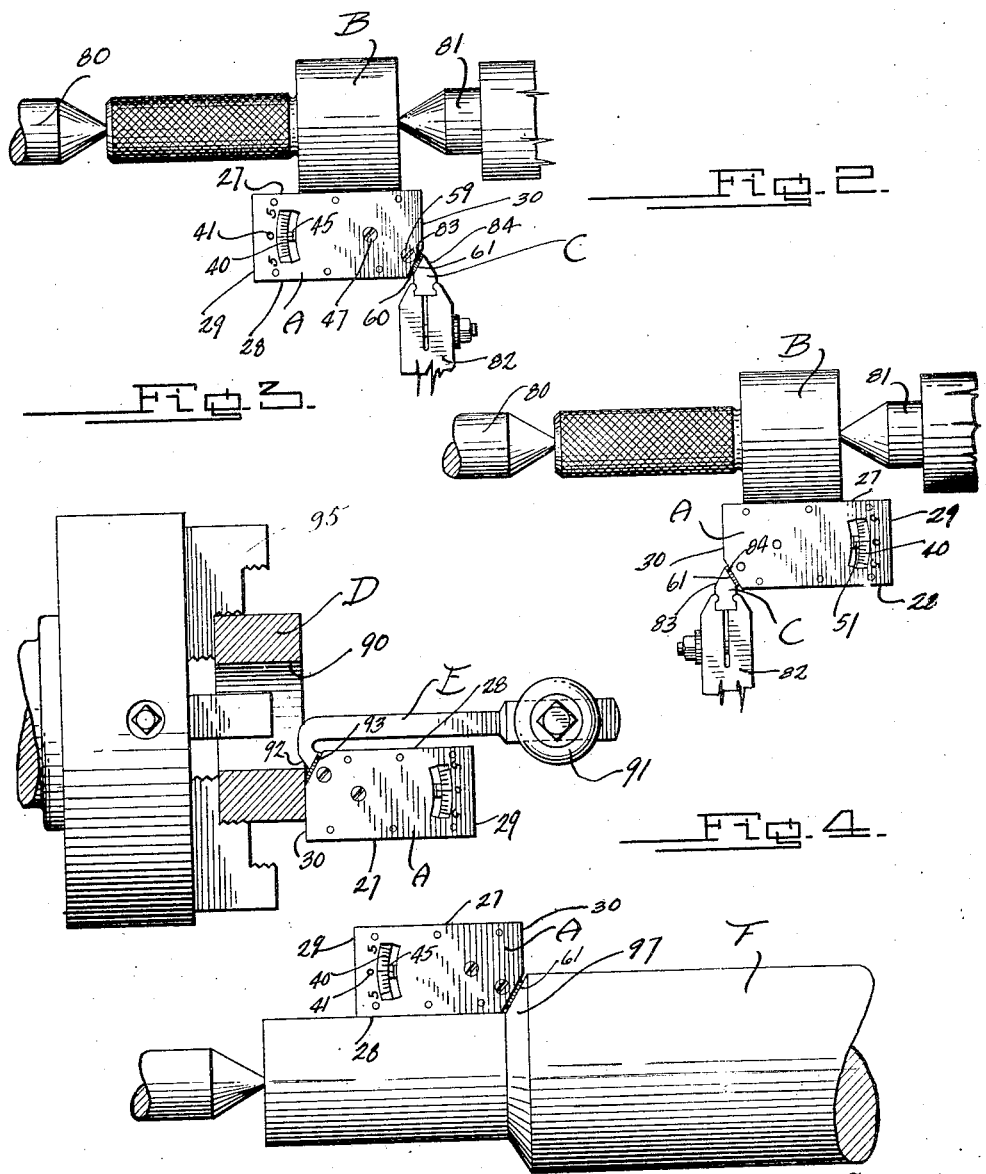

1,507,205

UNITED STATES PATENT OFFICE.

JOHN G. SAKOWICZ, OF SOUTH DEERFIELD, MASSACHUSETTS.

CENTER INDICATOR.

Application filed December 8, 1922. Serial No. 605,679.

*To all whom it may concern:*

Be it known that I, JOHN G. SAKOWICZ, a citizen of the United States, residing at South Deerfield, in the county of Franklin and State of Massachusetts, have invented certain new and useful Improvements in Center Indicators, of which the following is a specification.

This invention relates to improvements in gauges for determining the accuracy of surfaces of tools, work to be performed, and for general use as a gauging instrument, for machine shop use.

The primary object of the invention is the provision of a center indicator or gauge, primarily designed for use in connection with the correct positioning of a thread cutting tool with respect to a piece of work, so that the thread cutting tool may be positioned with exactness and precision for a thread cutting operation.

A further object of this invention is the provision of a gauge of the above mentioned character, embodying means for determining a discrepancy in the correct positioning of a cutting tool and a piece of work.

A further object of this invention is the provision of a gauge embodying a novel indicating arrangement.

Other objects and advantages of this invention will be apparent during the course of the following detailed description.

In the accompanying drawings, forming a part of this specification, and wherein similar reference characters designate corresponding parts throughout the several views.

Figures 1 and 2 show the manner in which the improved gauge is used in connection with the correct setting of a thread cutting tool to cooperate with a piece of work to be externally screw threaded.

Figure 3 is a fragmentary view, partly in cross section, showing the manner in which the improved center indicator may be used for determining correct positioning of a cutting tool in connection with a piece of the work to be internally screw threaded.

Figure 4 is a side elevation, showing the manner in which the improved gauge may be used in general.

Figure 5 is an enlarged side elevation of the improved gauge.

Figure 6 is a longitudinal cross section taken through the improved gauge, showing the interior indicating details thereof.

Figure 7 is a longitudinal cross sectional view, taken substantially on the line 7—7 of Figure 6.

Figure 8 is an end elevation of the improved gauge.

Figure 9 is a transverse cross sectional view, taken substantially on the line 9—9 of Figure 6.

Figure 10 is an enlarged fragmentary cross sectional view, taken substantially on the line 10—10 of Figure 6.

In the drawings, wherein for the purpose of illustration is shown but the preferred embodiment of the improved gauge, the letter A generally designates the improved gauge, which may include a frame 15, and an indicator arrangement 16.

The frame 15 is preferably constructed of tool steel, hardened and ground, and includes the side plates 17 and 18 of rectangular formation. These plates are connected in spaced relation by the spacing bars 19 and 20, which may be attached at the longitudinal edges of said plates, as by means of rivets or other securing elements 21. In this manner, the compartment 25 is provided intermediate the facing surfaces of the side plates 17 and 18, for reception of the indicator arrangement 16 to be subsequently described. The details of the frame 15 are, of course, assembled in stable, durable, and accurate manner, so that the upper and lower longitudinal edges 27 and 28 respectively, are in parallel relation, with the side edges 29 and 30 also in parallel relation; the straight edges 27 and 28 preferably being disposed at exactly 90° with respect to the side straight edges 29 and 30. One corner of the frame A is preferably removed, as at the intersecting points of the straight edges 28 and 30, to provide the beveled edge 34, disposed at obtuse angles with respect to the edges 28 and 30, to provide for the accommodation of a certain detail of the improved indicator arrangement 16 to be subsequently described. The side plates 17 and 18, adjacent the frame end edge 29 are preferably provided with arcuate slots 37 and 38 respectively, disposed transversely therethrough, intermediate the spacing bars 19 and 20. Exteriorly of the plates 17 and 18 and adjacent the slots 37 and 38, the graduations 40 are provided, on a beveled surface designated by certain indicia 41, which may indicate degrees, minutes, or seconds, or any arrangement according to the degree of accuracy, it is desired that the improved gauge will register.

The gauge indicator means 16 preferably includes an arm 45, pivoted as by a pin 47 within the compartment 25 of the frame A; the axis of the pin 47 preferably being the center from which the arcuate slots 37 and 38 are struck. The arm 45 includes the bearing portion 48, which has the pivot pin 47 disposed therethrough, as above mentioned, and the relatively long portion 49 extending on one side of the pivot pin 47, and having the head 50 on the free end thereof, the opposite side surfaces of which are provided with graduations 51 adapted to cooperate with the delineations or graduations 40 of the frame A. The head 50 of the indicator arm 45 is visible at all times, through the slots 37 and 38, and in such manner that the delineations 51 will align with the graduations 40. A shoulder portion 55 extends as a part of the indicator arm 45, opposite to the portion 49 with respect to the pivot pin 47, providing an inclined surface 56, upon which the pointed head 57 of an operating lever 58 bears. The operating lever 58 is pivoted, as by a pin 59, in the frame compartment 25, adjacent the bevelled edge 34, and provides an enlarged end portion 60 on the opposite side of the pivot 59 with respect to the pointed head 57, which has the end surface 61 thereon. This portion 60 extends laterally from the frame A, at the bevelled edge 34, so that the surface 61 of the lever 58 is disposed in obtuse and acute angular relation with respect to the edges 27, 28, 29 and 30 of the frame A, and to cooperate in a manner to be subsequently described. A spring 70 is preferably provided, which is of novel formation, including a single length of resilient material, bent upon itself to provide a body portion 71, and opposed outstanding ends 72$^a$ which are fixedly carried by the plates 17 and 18, so that the arcuate end 72 of the body portion 71 bears against the portion 49 of the indicator arm 45, for normally forcing the same to its maximum extent in one direction. The spring 70 thus acts on the indicator arm 45, so that the portion 49 thereof is normally urged toward the spacing bar 19, while the extension shoulder 55 normally acts toward the head portion 57 of the lever 58.

In operation, the gauge A may be utilized in many ways. As is illustrated in Figures 1 and 2 of the drawings, the improved gauge A is cooperatively used in connection with a piece of work B, and a thread cutting tool C. For such use, the work B, which may be a bolt shank, or any other work to be exteriorly screw threaded, is supported in the well known manner in a lathe or analogous device, by means of the supporting spindles 80 and 81, so that the cylindrical surface thereof may receive a straight edge of the improved gauge A thereagainst. The cutter tool C, which is of the well known V-shaped formation, may be supported by the tool holder 82 or analogous device, so that the inclined forming surfaces 83 and 84 of the cutter blade or tool C extend toward the work B. In order to test the accuracy of the positioning of the cutter C with respect to the work B, the operator first positions the gauge A so that the straight edge 27 thereof rests longitudinally against the outer surface of the work B, substantially as is illustrated in Figure 1 of the drawings. The gauge A is then moved toward the tool holder 82, so that the exposed surface 61 of the lever 58 engages the facing surface 83 of the thread cutting tool C. The gauge A is, of course, selected for use in connection with a particular pitch angle of thread desired. Thus, as the gauge A is moved as above indicated, the surface 61 of the lever 58 abuts in plane contacting relation with one inclined face 83 of the cutter tool C, and if the tool C is accurately positioned with respect to the work B, such engagement of the surface 61 against the thread cutting tool C will swing the arm 45, so that the indicator mark 51 thereon aligns with the zero mark of the graduations. The operator will next test the accuracy of the positioning of the other face 84 of the threading element C, by shifting the holder 82 to the other side of the work B, in the position indicated in Figure 2 of the drawings, and by placing the gauge A so that the straight edge 27 thereof engages longitudinally of the outer surface of the work B, and moving the gauge so that the surface 61 of the lever 58 engages the face 84 of the cutting tool or element C. If now, the indicator mark 51 of the arm 45 also swings to the zero graduation 41, the operator is informed of the fact that the axis of the cutter C is exactly at right angles to the axis of the work B, and screw threads may be exteriorly disposed on said work B at precisely the pitch angle desired. It is readily apparent that this is an accurate gauging means for determining the relative positioning of the thread cutting tool C with respect to its work B. If, during the application of the gauge A as above outlined, the arm 45 should swing so that the indicator mark 51 would designate a graduation 41, other than the zero mark, it is apparent that a discrepancy exists in the correct positioning of the thread cutting element C, and this discrepancy will have to be done away with by adjusting of the tool holder within the tool post. A feature of the improved center indicator gauge A, which makes the same particularly desirable, where accuracy is desired, is in the fact that a very small angular displacement of a face of the cutting element C will be apparent over a relatively large arcuation on the graduated surface of the gauge A. This is primarily due to the fact that the lever 58 of the indicator means 16, operates on the shoulder 55 close to the pivot 47 of indicator arm 45.

Referring to Figure 3, the improved gauge A is shown, as used in connection with a piece of work D to be interiorly screw threaded on an annular surface 90; a cutting tool E providing the intersecting cutting faces 92 and 93 being utilized upon the supporting post 91. The work D is supported, as by a chuck 95. For such use, the gauge A is moved so that the straight edge 30 thereof engages the outer flat surface of the article D to be threaded, and moved so that the lever face 61 engages a side 93 of the cutter tool E, substantially as is illustrated in Figure 3 of the drawings. The other face 92 of the cutter E is tested, in similar manner, although in order to test the accuracy of the positioning of the face 92, the straight edge 29 will have to be disposed against the work D, as will be readily understood.

The improved gauge A may be used generally in connection with various classes of work, such as is illustrated in Figure 4 of the drawings, in which the center gauge A is used for determining the accurate bevelling of an inclined shoulder 97, of a shaft F. For such use, the gauge A is placed, so that the edge 28 thereof rests upon the surface of the shaft F, and the lever surface 61 is moved into engagement with the shoulder 97 to be tested. The accuracy of the pitch of the shoulder 97 is determined by means of the indicator arm 45 cooperating with the graduations 40. This type of gauge need have only one side thereof graduated.

Various other classes of work can, of course, be tested by means of the improved gauge, as will be readily apparent to those skilled in the art to which this invention pertains.

From the foregoing description of this invention, it is obvious that a gauge has been provided, which is particularly desirable for use in connection with the accurate testing, or positioning of thread cutting tools with respect to the work to be threaded. Ordinary thread cutting gauge means contemplate the clamping of the center gauge intermediate the work to be threaded and the threading tool; no accurate indicating arm or graduation being provided for determining the accuracy of positioning of the cutter element, it being left for the operator to determine whether any clearance exists between the engaging surfaces of the center gauge and the thread cutting tool, generally resulting in inaccuracies as is well known. However, with the improved gauge, angular discrepancies of the cutter tool with respect to the work to be threaded, are shown, even in minutest angular variation. While some provision for adjustment for compensation of wearing surfaces may be made to the improved gauge A, yet for practical purposes such adjustment need not be made. In view of the fact that the gauge may be read on both sides thereof, use of the same in connection with a gauging operation is facilitated.

Various changes in the shape, size, and arrangement of parts, may be made to the form of invention herein shown and described, without departing from the spirit of the invention or the scope of the claims.

I claim:

1. A gauge comprising a frame having opposed side edges in parallel relation, opposed end edges thereof in parallel relation, said side and end edges respectively disposed at right angles to each other and one corner portion of said frame being cut off to provide a diagonally disposed edge face between adjacent end and side edge faces; and indicator means movably supported by said frame and including an article engaging extension projecting through the diagonally disposed edge face and without projecting beyond the planes of the adjoining side and end edges cooperatively disposed with respect to said side and end edges.

2. A gauge comprising a frame having edges disposed at predetermined angles relatively to one another and adapted for work engagement to position said frame in predetermined manner with respect to a piece of work, and indicator means supported by said frame and including a lever pivoted intermediate its length for oscillation to said frame and providing a relatively long indicator portion and a relatively short portion extending opposite to said indicator portion, and a lever pivoted to said frame and slidably engaging said relatively short portion of the first-mentioned lever, said second-mentioned lever including an edge portion in predetermined angular relation with respect to the edge portions of said frame.

3. A gauge comprising a frame having the side and end edges thereof disposed in right angled relation, with one corner of the same bevelled, and indicator means movably carried by said frame and including an article engaging extension having a surface angularly disposed relative to said side and end edges and which projects beyond the bevelled edge of said frame.

4. A gauge comprising spaced plates providing a compartment therebetween, the plates being so arranged that the edges thereof are disposed in a desired angular relation for work engaging purposes, said plates having graduations thereon, an indicator member pivotally mounted intermediate its ends in the compartment of said frame so that one relatively long portion extends from the pivot mounting thereof for cooperation adjacent the graduations of said frame and an opposite portion extends from the pivot mounting of said indicator member, a spring carried by said frame engaging the longer portion of said indicator member at a side thereof to normally urge the same in one direction, and an article engaging lever pivotally mounted intermediate its ends to provide a relatively long portion which has a finger projection on the end thereof for slidable contact with the relatively shorter portion of the indicator member, said article engaging lever having a relatively shorter portion extending outwardly from an edge of said frame for article engaging purposes.

5. In a gauge of the class described the combination of a frame, an indicator arm pivotally carried by the frame, a spring cooperating against the indicator arm to normally urge the same in one direction, and a lever cooperating against said indicator arm, said frame adapted for engagement with a piece of work to assume a predetermined position in stable manner thereagainst whereby upon movement of said gauge the lever may cooperate against a cutting tool for movement of the indicator arm against action of said spring.

JOHN G. SAKOWICZ.